United States Patent [19]
Yang et al.

[11] Patent Number: 5,658,977
[45] Date of Patent: Aug. 19, 1997

[54] HOT WATER SOLUBLE DISPOSABLE FILMS, FABRICS AND ARTICLES

[75] Inventors: Xiaoming Yang; Robert J. Petcavich, both of San Diego, Calif.

[73] Assignee: Planet Polymer Technologies, Inc., San Diego, Calif.

[21] Appl. No.: 583,770

[22] Filed: Jan. 11, 1996

[51] Int. Cl.$^6$ .............................. C08G 63/48; C08L 29/04
[52] U.S. Cl. ............................. 524/503; 525/58; 525/60
[58] Field of Search .................. 525/58, 60; 524/503

[56] References Cited

U.S. PATENT DOCUMENTS

| | | | |
|---|---|---|---|
| 3,413,229 | 11/1968 | Bianco et al. | 252/90 |
| 3,632,687 | 1/1972 | Walter et al. | 260/896 |
| 3,734,979 | 5/1973 | Walter et al. | 260/897 |
| 3,852,913 | 12/1974 | Clendinning et al. | 47/37 |
| 3,859,125 | 1/1975 | Miller et al. | 428/511 |
| 3,867,324 | 2/1975 | Clendinning et al. | 260/23 H |
| 3,919,163 | 11/1975 | Clendinning et al. | 260/40 R |
| 3,935,308 | 1/1976 | Wise | 424/78 |
| 4,284,671 | 8/1981 | Cancio et al. | 428/35 |
| 4,306,552 | 12/1981 | Gregory | 128/156 |
| 4,343,133 | 8/1982 | Daniels et al. | 53/431 |
| 4,379,138 | 4/1983 | Pitt et al. | 424/78 |
| 5,181,966 | 1/1993 | Honeycutt et al. | 134/42 |
| 5,181,967 | 1/1993 | Honeycutt | 134/42 |
| 5,200,247 | 4/1993 | Wu et al. | 428/131 |
| 5,207,837 | 5/1993 | Honeycutt | 134/42 |

FOREIGN PATENT DOCUMENTS 4139248  5/1992  Japan.

OTHER PUBLICATIONS

"National Research and Development Plan of Biodegradable Plastics in Japan", author and date unknown, pp. 1–14 12.
"TONE® Polymers–Biodegradable Plastic Resins", published by Union Carbide Chemicals and Plastics Company, Inc. author unknown, 1990, pp. 1–17.
"Specific Interactions and the Miscibility of Polymer Blends", Coleman, Graf & Painter, Technomic Publishing Co., Inc.
DuPont "Elvanol" Specification Sheet (Date Unknown).
"Degradable Plastics", John W. Moore, Modern Plastics, Mid–Dec. 1992, pp. 58–63.

*Primary Examiner*—Helen Lee
*Attorney, Agent, or Firm*—Juettner, Pyle, Lloyd & Piontek

[57] ABSTRACT

Cold water insoluble, hot water soluble and/or dispersible, disposable films, fabrics and other useful articles of manufacture are formed from a miscible polymeric resin blend comprised of cold water soluble partially hydrolyzed polyvinyl alcohol, cold water insoluble hot water disintegrable aliphatic polyester, and minor proportions of processing and performance aids. The aliphatic polyester has a melt temperature above the normal body temperature of a human (37 degrees C.; 98.6 degrees F.) and is present in the resin blend at a concentration sufficient to constitute the continuous phase of the blend, with the polyvinyl alcohol constituting a discontinuous phase of the blend. The aliphatic polyester thus renders the resin blend, and the partially hydrolyzed polyvinyl alcohol in the blend, cold water insoluble and determines the temperature at which articles formed from the blend will be subject to dissolution in an aqueous bath and subsequent disposal in an environmentally and ecologically sound fashion.

7 Claims, No Drawings

HOT WATER SOLUBLE DISPOSABLE FILMS, FABRICS AND ARTICLES

FIELD OF THE INVENTION

The present invention relates to cold water insoluble, hot water soluble and/or dispersible, disposable films, fabrics and articles, and resin blends for producing the same.

BACKGROUND

U.S. Pat. No. 5,207,837 discloses a method of disposing of hospital garments and like fabric articles which are not water soluble at temperatures below normal body temperature (37 degrees C.; 98.6 degrees F.) and which are water soluble at temperatures above normal body temperature, so as to be disposable by dissolution in hot water. See also related U.S. Pat. No. 5,181,966 disclosing hot water soluble packaging materials, and U.S. Pat. No. 5,181,967 disclosing a method for disposal of hot water soluble utensils.

As described in U.S. Pat. No. 5,207,837, hospital patient care generates considerable quantities of infectious medical waste. There has been a general conversion from reusable, cleanable items, to disposable items. These conversions were made to promote antiseptic techniques in patient care and to decrease the potential for cross infections between patients, staff and the general public.

The best way to deal with infectious medical waste, the patent states, is to disinfect it at the point of generation and dispose of the treated medical waste with minimum handling and on site storage.

The need for an effective way to dispose of medical waste calls for establishment of an exposure control plan, the containment of specimens of blood or other potentially infectious materials and the general tightening of precautionary measures to minimize the spread of disease. A safe and effective way to dispose of hospital waste in the form of soiled garments and apparel would greatly facilitate compliance.

Disposable medical fabrics are generally currently composed of thermoplastic fibers such as polyethylene, polypropylene, polyesters, polyamides and acrylics. These fabrics can also include mixtures of thermoset fibers such as polyimides, polyarimids and cellulosics. They are typically 10–100 grams per square yard in weight and can be woven, knitted or otherwise formed by methods well known to those in the textile arts while the nonwovens can be thermobonded, hydroentangled, wet-laid or needle punched, again by methods which are well known in the textile arts.

Although there is clearly a benefit in the use of disposables in the medical arts, nonbiodegradable disposables are posing a serious problem. Landfill sites are becoming increasingly burdened with disposables which do not biodegrade for hundreds of years, if ever. As landfill sites become fully exploited, new sites must be found, which are vigorously opposed by residents located proximate to proposed site locations.

U.S. Pat. No. 5,207,837 proposes to solve these problems by the provision of fabrics which are not soluble at temperatures customarily encountered in hospitals, i.e., body temperature and below, and which are soluble at temperatures above normal body temperature, preferably above 50 degrees C. (122 degrees F.) and most preferably in the range of 80–90 degrees C. (176–194 degrees F.). Working with such a hot water soluble polymer would prevent involuntary solubilization upon exposure to body fluids, yet remain viable for subsequent hot water dissolution and disposal.

The patent contemplated that disposal in a hot water bath, such as a washing machine at or near the boiling point of water and dedicated to solubilizing garments, linens and other useful articles would also be an effective disinfecting media. As such, two objectives would be accomplished, namely, that the polymer or sheets would be disinfected and would be solubilized for disposal through the sewer system. Not only would this lessen the burden imposed on landfill sites but liquid sewer disposal would prove a comparative low cost technique in ridding the user of such used garments.

According to the patent, polymer or sheet materials useful for the purpose comprise polyvinyl alcohol with or without acetyl groups, cross-linked or uncross-linked. Ideally, the garments are comprised of polyvinyl alcohol homopolymer that has been highly crystallized by post drawing or heat annealing. Ideal for use would be a highly crystallized totally saponified polyvinyl acetate, such as the polyvinyl alcohol available from Air Products under the trademark Vinex 1003.

However, polyvinyl alcohols that are highly crystallized by post drawing or heat annealing, or by total or substantially total saponification or hydrolyzation, are expensive, very difficult to process, and soluble only at temperatures approaching the boiling point of water. A more economical, more easily processed, and more readily solubilized alternative is required.

SUMMARY OF THE INVENTION

The object of the present invention is to provide improved, economical and readily processed polyvinyl alcohol compositions for producing films, fabrics and other useful articles that are cold water insoluble, hot water soluble and/or dispersible, and completely disposable and degradable upon immersion in moderately hot water.[1]

[1] As used herein, "cold" water is generally deemed to be water at or below a temperature of 37 degrees C. or 98.6 degrees F., "hot" water is generally deemed to be water at a temperature above 37 degrees C. or 98.6 degrees F., and "moderately hot" water is water at a temperature above the disinfecting temperature for bacteria, nominally in the order of about 60 degrees C. to about 70 degrees C. (140–160 degrees F.)

Another object of the invention is to provide improved polyvinyl alcohol compositions for producing fabrics and the like that are comprised of relatively economical, partially hydrolyzed, cold water soluble polyvinyl alcohol and one or more additional constituents for rendering the composition cold water insoluble and hot water soluble or dispersible.

In accordance with the invention, cold water insoluble-hot water soluble and/or dispersible films, fabrics and other useful articles are produced from a miscible polymeric blend comprised in major part by weight of partially hydrolyzed polyvinyl alcohol and a biodegradable polyester, together with minor proportions of processing or performance aids.

The polyvinyl alcohol employed is in the order of about 88 percent hydrolyzed and not post drawn or heat annealed. It is "partially hydrolyzed", not "fully hydrolyzed".[2] It is actually a copolymer comprised of about 88 percent polyvinyl alcohol (PVOH) and about 12 percent polyvinyl acetate (PVA) that is soluble in "cold" water, i.e., water well below body temperature.

[2] The manufacturer of "Vinex" brand polyvinyl alcohol (PVOH), Air Products and Chemicals, Inc., in its U.S. Pat. No. 4,343,133, column 1, line 56 to column 2, line 18, defines "fully hydrolyzed" PVOH as being 95–99 percent hydrolyzed and defines "partially hydrolyzed" PVOH as being 80–95 percent hydrolyzed.

Cold water insolubility is attained by addition to the partially hydrolyzed PVOH, in a miscible polymeric blend, of a cold water insoluble/hot water soluble or disintegrable aliphatic polyester that in essence serves as a binder and sealant for the partially hydrolyzed polyvinyl alcohol. The polyester is selected on the basis of its melt temperature so as to provide a film or fabric that will disintegrate or disperse at a desired temperature above normal body temperature, and preferably above the disinfecting temperature for bacteria, say for example, about 60 degrees C. (140 degrees F.). When the film or fabric is immersed in moderately hot water, the polyester will melt and disintegrate in the water, whereupon the partially hydrolyzed polyvinyl alcohol will dissolve in the water.

The miscible polymeric resin blend of the invention is very economical, especially when compared to fully hydrolyzed or saponified PVOH. Also, the blend is melt processible by conventional thermoforming techniques, whereas fully hydrolyzed PVOH, despite assertions to the contrary, does not process as a thermoplastic and in commercial practice is cast from a solution. Thus, the present invention provides significant savings in both material costs and processing costs.

Fabrics, films and other useful products that are cold water insoluble and hot water soluble or dispersible may thus be produced with facility and particular economy. Also, because the solubility temperature lies within a moderate range, e.g., 60 degrees C., hospital garments and other fabric and film products may be disposed of in a conventional clothes washing machine and do not require a special washing machine operating at temperatures near the boiling point of water.

These and other features and advantages of the invention will become apparent from the following detailed description.

DETAILED DESCRIPTION OF THE PREFERRED EMBODIMENTS

The following is a detailed description of the embodiments of the invention presently deemed by the inventors to be the best mode of practicing their invention.

As above noted, the invention provides a miscible polymeric resin blend comprised in major part by weight of polyvinyl alcohol and a biodegradable aliphatic polyester, together with minor proportions of processing and/or performance aids.

The polyvinyl alcohol employed is a partially hydrolyzed PVOH, i.e., one that is 80–95 percent hydrolyzed and most preferably about 87–89 percent hydrolyzed. The PVOH should comprise in the order of about 45–60 percent by weight of the resin blend, preferably somewhat over 50 percent. Suitable partially hydrolyzed polyvinyl alcohols are obtainable from DuPont under the trademark "Elvanol", in particular "Elvanol 51-05", and from Air Products under the tradename "Airvol", in particular "Airvol 205".

The aliphatic polyester is selected from a group of polyesters and polyester-co-polymers that are miscible with PVOH and that will at a reasonable concentration in the blend become the continuous phase of the blend while the PVOH becomes a discontinuous phase. Being the continuous phase, the aliphatic polyester bonds the PVOH in the blend and prohibits dissolution or leaching of the PVOH until the polyester is disintegrated upon immersion in moderately hot water. The preferred aliphatic polyester is polycaprolactone (PCL), which has a melt temperature of about 60 degrees C. (140 degrees F.) and thus establishes an ideal temperature for dissolution and disposal of fabric garments and other products in a conventional clothes washing machine at conventional clothes washing temperatures.

The concentration of the aliphatic polyester in a resin blend is critical, since it is the aliphatic polyester that renders the blend, and the partially hydrolyzed polyvinyl alcohol in the blend, cold water insoluble. The concentration should not be excessive, but must in any event be sufficient to constitute the polyester as the continuous phase in the blend, with the PVOH constituting a discontinuous phase.

In the case of PCL, the concentration in the blend is preferably in the order of about 35 percent to about 50 percent by weight, with at least about 35 percent being a preferred lower limit. PCL is available from Union Carbide under the trademark "Tone". Other suitable aliphatic polyesters include poly(ethylene adipate), unsaturated polyesters, cyclo-polyesters, substituted aliphatic polyesters, and copolymers comprising different combinations of the foregoing. More particularly, the polyester may be selected from types having the following formulae:

1. Ploy(caprolactone) Type

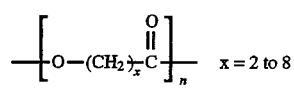

2. Poly(ethylene Aidpate) Type

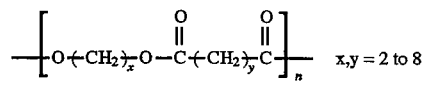

3. Substituted Aliphatic Polyesters

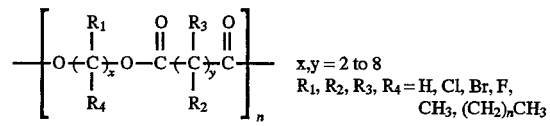

4. Unsaturated Polyesters

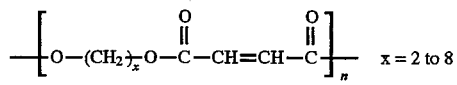

5. Copolyesters

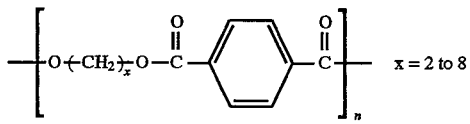

The processing and performance aids include plasticizers such as glycerin, low molecular weight poly(ethylene oxide), e.g., "Carbowax", and the like; antioxidants such as Irganox 1076; a diluent, especially a liquid aliphatic ester; and, optionally, water. The plasticizer may be present in the range of about 3–30 percent by weight of the resin blend; the antioxidant in the range of about 0.2–0.5 percent; the liquid aliphatic ester diluent in the range of about 1–15 percent; and water in the range of about 0–10 percent.

The liquid aliphatic ester diluent is an important factor in the blend and preferably is selected from triacetin, diisodecyl adipate (DIDA) and liquid aliphatic esters having the formula

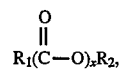

wherein $R_1$ and $R_2=CH_2-1{,}20$ and $x=1-5$.

An especially preferred miscible, polymer resin blend for producing hot water dispersible/cold water insoluble films, fabrics and other useful articles that are readily dispersible in moderately hot water, is comprised of the following:

| | |
|---|---|
| PVOH (Elvanol 51-05) | 50.75% |
| PCL (Tone 787) | 35.0% |
| Glycerin | 6.5% |
| Triacetin | 4.0% |
| Antioxidant (Irganox 1076) | 0.25% |
| Water | 3.5% |

The resultant polymer blend is miscible, has a single glass transition temperature, and is melt processible in manners and at temperatures that are conventional for the processing of thermoplastic polymers. Thus, known techniques may be employed to produce extrusions, molded articles, sheets, films, blown films, fabrics and the like. All of the resultant products are cold water insoluble and hot water soluble or dispersible; specifically, that are insoluble in water or aqueous solutions at temperatures below and soluble or dispersible in water or aqueous solutions at temperatures above the melting temperature of the aliphatic polyester, e.g., about 60 degrees C. Thus, hospital fabrics, sheets, garments and the like can be disinfected, dispersed and disposed of by "washing" the same in a conventional clothes washing machine at conventional clothes washing temperatures.

The objects and advantages of the invention have been shown to be attained in a convenient, practical, economical and facile manner.

While preferred embodiments of the invention have thus been disclosed and described, it is to be appreciated that various changes, rearrangements and modifications may be made therein without departing from the scope of the invention as defined by the appended claims.

What is claimed is:

1. A resin blend for making disposable, cold water insoluble, hot water dispersible, thermoplastic articles of manufacture, comprising a melt processible miscible polymeric resin blend comprised of in the order of 45–60% by weight of cold water soluble partially hydrolyzed polyvinyl alcohol, in the order of 35–50% by weight of a biodegradable cold water insoluble hot water disintegrable aliphatic polyester, and a minor part by weight of performance aids, said aliphatic polyester having an aqueous solution disintegration temperature greater than 37 degrees C. and no greater than about 70 degrees C. and being present in the blend in an amount sufficient to constitute the continuous phase of the blend, with the polyvinyl alcohol constituting a discontinuous phase of the blend, the resin blend and articles made therefrom being insoluble and nondispersable in aqueous solution at temperatures of 37° C. or less and being dispersable and disposable in aqueous solution at a temperature above 37° C. but no greater than about 70° C.

2. A resin blend as set forth in claim 1 wherein said performance aids include a liquid aliphatic ester diluent.

3. A resin blend as set forth in claim 1 wherein the performance aids include a plasticizer comprising from about 3 percent to about 30 percent by weight of the resin blend and a liquid aliphatic ester comprising from about 1 percent to about 15 percent by weight of the resin blend.

4. A resin blend as set forth in claim 1 comprising at least about 50 percent by weight of partially hydroloyzed polyvinyl alcohol, at least about 35 percent by weight of aliphatic polyester, at least about 3 percent by weight of plasticizer, and at least about 1 percent by weight of a liquid aliphatic ester.

5. A resin blend as set forth in claim 4 wherein the aliphatic polyester is selected from the group comprising polycaprolactone, poly(ethylene adipate), unsaturated polyesters, cyclo-polyesters, substituted aliphatic polyesters, and copolymers comprising combinations thereof.

6. A resin blend as set forth in claim 4 wherein the liquid aliphatic ester is selected from the group comprising triacetin, diisodecyl adipate, and esters having the formula

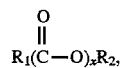

wherein $R_1$ and $R_2$=$CH_2$–1,20 and x=1–5.

7. A resin blend as set forth in claim 1 comprising about 50–52 percent partially hydrolyzed polyvinyl alcohol, about 35 percent polycaprolactone, about 6–7 percent plasticizer, about 3–5 percent liquid aliphatic ester, an antioxidant and, optionally, water.

* * * * *